H. P. KRAFT.
GAUGE FOR PNEUMATIC TIRES OR THE LIKE.
APPLICATION FILED DEC. 16, 1916. RENEWED MAR. 23, 1922.
1,433,517. Patented Oct. 24, 1922.
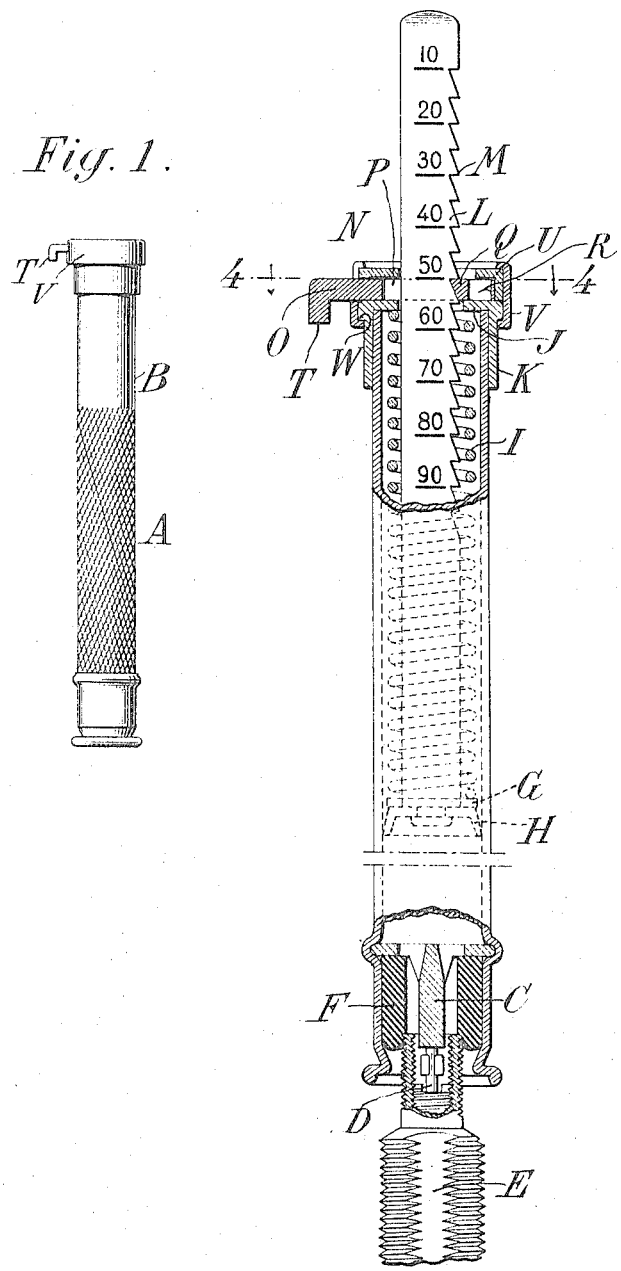
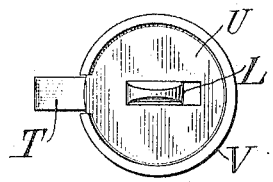
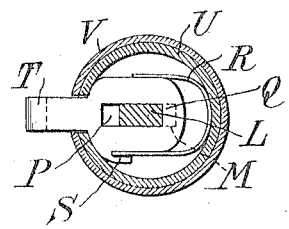
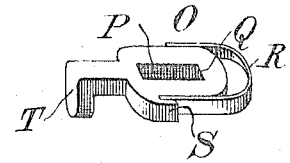
WITNESSES:
INVENTOR:
Henry P. Kraft
By Attorneys, Patented Oct. 24, 1922.

1,433,517

UNITED STATES PATENT OFFICE.

HENRY P. KRAFT, OF RIDGEWOOD, NEW JERSEY.

GAUGE FOR PNEUMATIC TIRES OR THE LIKE.

Application filed December 16, 1916. Serial No. 137,325. Renewed March 23, 1922. Serial No. 546,181.

*To all whom it may concern:*

Be it known that I, HENRY P. KRAFT, a citizen of the United States of America, residing in Ridgewood, in the county of Bergen and State of New Jersey, have invented certain new and useful Improvements in Gauges for Pneumatic Tires or the like, of which the following is a specification.

This invention relates to gauges for pneumatic tires or the like and aims to provide certain improvements therein.

The invention is particularly directed to that type of gauge in which there is a movable piston or its equivalent, acted upon by the column of air beneath it to raise it against the tension or compression of a spring, a suitable gauge bar being fixed to the piston and usually being adapted to extend beyond the end of the casing to indicate the pressure. In one type of such gauges means are provided for holding the gauge bar in its extended position against the tension or compression of the spring. In this type of gauge the gauge bar is commonly provided with a series of teeth or projections designed to be engaged by a catch device to prevent its retraction until manually reset. The present invention relates to a novel form of catch device which is simple and effective in its operation and not liable to become deranged in use. The invention includes certain other features of construction which will be hereinafter more fully described.

Referring to the accompanying drawings which illustrate the invention in its preferred form,—

Figure 1 is an elevation of the complete gauge;

Fig. 2 is a similar view showing the gauge applied to a tire valve and also showing certain other parts in diametrical section;

Fig. 3 is a top or plan view;

Fig. 4 is a cross section on the line 4—4 of Fig. 2;

Fig. 5 is a perspective view of the catch device and its actuating spring detached.

Referring to the drawings, let A indicate the gauge as a whole which is best constructed with a casing such as B, having at its lower end an abutment C adapted to contact with the pin D of a pneumatic tire valve or the like E. A packing F is introduced in the lower part of the casing for the purpose of making a tight joint with the valve member as is customary in pneumatic tire gauges. Above the abutment C is located a piston G having a packing H of leather or other suitable material, the piston moving within the gauge body against the tension of a spring I, the upper end of which bears against a flange J, formed on a collar K embracing the upper end of the casing. The movements of the piston G are indicated by a gauge bar L, usually extending through the top of the casing as shown, the latter serving as a pointer to coact with a graduated scale in the gauge bar.

The gauge bar is formed with a series of projections which conveniently take the form of teeth M and which are designed to be engaged by a catch, whereby the gauge bar is held in any of its extended positions.

The catch device which is indicated as a whole by the reference letter N forms the principal part of the present invention.

According to the invention the catch is preferably mounted at the top of the casing and comprises a reciprocating member designed in one position to engage the bar and in another position to release it. As shown, it is formed as a slide O having an opening or recess P through which the gauge bar extends, one end of the slide having a beveled or tooth portion Q of appropriate shape to engage the teeth M of the gauge bar. In the construction shown a spring R is provided for normally holding the slide in its operative position and for compactness the spring R is preferably formed as a flat or leaf spring, one end S of which is confined in a slot formed in the side of the slide, and the other end of which plays idly along the opposite side of the slide, the bow of the spring pressing against the side of the casing or its equivalent. The slide is best provided with a thumb piece T whereby it may be conveniently pressed in by the operator to release the gauge bar and permit it to be retracted by its spring.

In the construction illustrated the slide is supported and moves across the top of the flange J of the collar K, being prevented from outward displacement by a ring U held in place on the top of the collar K by a coupling V, the upper end of which is turned over the ring U, and the lower end of which is turned under a flange W formed on the collar K. The ring U is of course provided with an appropriate passage for the thumb piece T as best shown in Fig. 4.

In operation, as the gauge bar is moved upwardly by the pressure of the pneumatic tire or other container, the slide is moved to the right (see Fig. 2) by the inclined faces of the teeth M until the maximum projection is reached, whereupon the gauge bar is held against retraction as shown. The spring R may be of very light construction so as to interpose no appreciable frictional resistance to the movement of the gauge bar, whereby the latter registers accurately the true pressure within the tire. The device is positive in its action and durable in use. The strains of holding up the gauge bar (which are considerable) are borne by the collar K so that derangement is unlikely. Furthermore, it will be noticed that the construction is such that there is little if any tendency to tilt the gauge bar, the latter being held in a position which is substantially in axial alignment with the casing.

It will be understood that various changes may be made in the construction illustrated without departing from the invention. It is obvious that the construction may be used in connection with a gauge in which the gauge bar is not connected to the piston, a specific application of said idea being embodied in my copending application Serial No. 455,680.

What I claim is:—

1. A pressure gauge for pneumatic tires, comprising an elongated casing, a pressure-responsive element movable lengthwise with relation to said casing to indicate the pressures, said pressure-responsive element having ratchet teeth, and a sliding catch device arranged to slide transversely of the pressure-responsive element, said catch device having means for normally holding it in operative position, in which it engages one of said teeth, and said teeth being constructed to slide past said catch device in the movement toward a higher indicating position, and said catch device being adapted to automatically engage one of said teeth when the movement of said pressure-responsive element stops, and means for mounting said catch device to slide transversely of the pressure-responsive element.

2. A pressure gauge for pneumatic tires, comprising an elongated casing, a pressure-responsive element movable lengthwise with relation to said casing, to indicate the pressures, said pressure-responsive element having ratchet teeth, and a sliding catch device arranged to slide transversely of the pressure-responsive element, said catch device having means for normally holding it in operative position, in which it engages one of said teeth, and said teeth being constructed to slide past said catch device in the movement toward a higher indicating position, and said catch device being adapted to automatically engage one of said teeth when the movement of said pressure-responsive element stops, and means for mounting said catch device to slide at right angles to said pressure-responsive element.

3. A pressure gauge for pneumatic tires, comprising an elongated casing, a pressure-responsive element movable lengthwise with relation to said casing, to indicate the pressures, said pressure-responsive element having ratchet teeth, and a sliding catch device arranged to slide transversely of the pressure-responsive element, said catch device having means for normally holding it in operative position, in which it engages one of said teeth, said teeth being constructed to slide past said catch device in the movement toward a higher indicating position, and said catch device being adapted to automatically engage one of said teeth when the movement of said pressure-responsive element stops, and means for mounting said catch device to slide transversely of the pressure-responsive element, said catch device having a slot through which said pressure-responsive element moves.

4. A pressure gauge for pneumatic tires, comprising an elongated casing, a pressure-responsive element movable lengthwise with relation to said casing, to indicate the pressures, said pressure-responsive element having ratchet teeth, and a sliding catch device arranged to slide transversely of the pressure-responsive element, said catch device having means for normally holding it in operative position, in which it engages one of said teeth, said teeth being constructed to slide past said catch device in the movement toward a higher indicating position, and said catch device being adapted to automatically engage one of said teeth when the movement of said pressure-responsive element stops, and means for mounting said catch device to slide transversely of the pressure-responsive element, said catch device having a slot through which said pressure-responsive element moves, and a bow spring for yieldingly holding said catch device in its engaging position.

In witness whereof, I have hereunto signed my name.

HENRY P. KRAFT.